INVENTORS.
MANUEL TURCHAN
CURTIS WALKER
BY
Robert A. Sloman

INVENTORS.
MANUEL TURCHAN
CURTIS WALKER

Patented June 11, 1946

2,401,803

UNITED STATES PATENT OFFICE 2,401,803

HYDRAULIC DUPLICATING MILLING ATTACHMENT FOR ROTARY TABLES

Manuel Turchan, Dearborn, and Curtis Walker, Detroit, Mich.

Application November 5, 1942, Serial No. 464,691

12 Claims. (Cl. 90—13.7)

This invention relates to hydraulic duplicating attachments for milling machines, and more particularly to a milling machine having thereon a longitudinally adjustable rotatable work and pattern supporting table.

It is the object of the present invention to provide a duplicating attachment for a milling machine wherein a longitudinally reciprocable slide is provided, and a rotary work and pattern supporting table is provisioned upon said slide.

It is the object of this invention to provision a hydraulically actuated motor for rotating said table at any desired speed.

It is the further object herein to provide manually operable reversing means in conjunction with said fluid motor.

It is the further object herein to provide a common rotatable pattern and work piece support so that said pattern and work piece will rotate in unison, together with means for supporting a feed cylinder controlling tracer for operative engagement with said rotating pattern, and with means for supporting cutting means in operative engagement with said work piece.

It is the still further object herein to provide a tracer controlled governor for the fluid motor for the rotary work table whereby upon the tracer engaging a sudden obstruction on the pattern, rotation of the same will be slowed down substantially or stopped until the feed cylinder has longitudinally adjusted the work table slide so that the tracer can follow the contour of the pattern without damage to the tracer, the cutting tool, or the work piece.

It is the still further object herein to provide a hydraulic unit for supplying fluid under pressure to the fluid motor for rotatably actuating the pattern and work piece upon the longitudinally adjustable slide, and at the same time provide fluid under pressure to the tracer for direction to one end or the other of the cylinder for governing reciprocable movement of said slide.

This invention relates to the various elements and their combinations as more fully set out hereafter in connection with the appended drawings of which—

It will be understood that the above drawings illustrate merely a preferable embodiment of the invention, and that it is contemplated that other embodiments are possible within the scope of the claims hereinafter set out.

Figure 1:
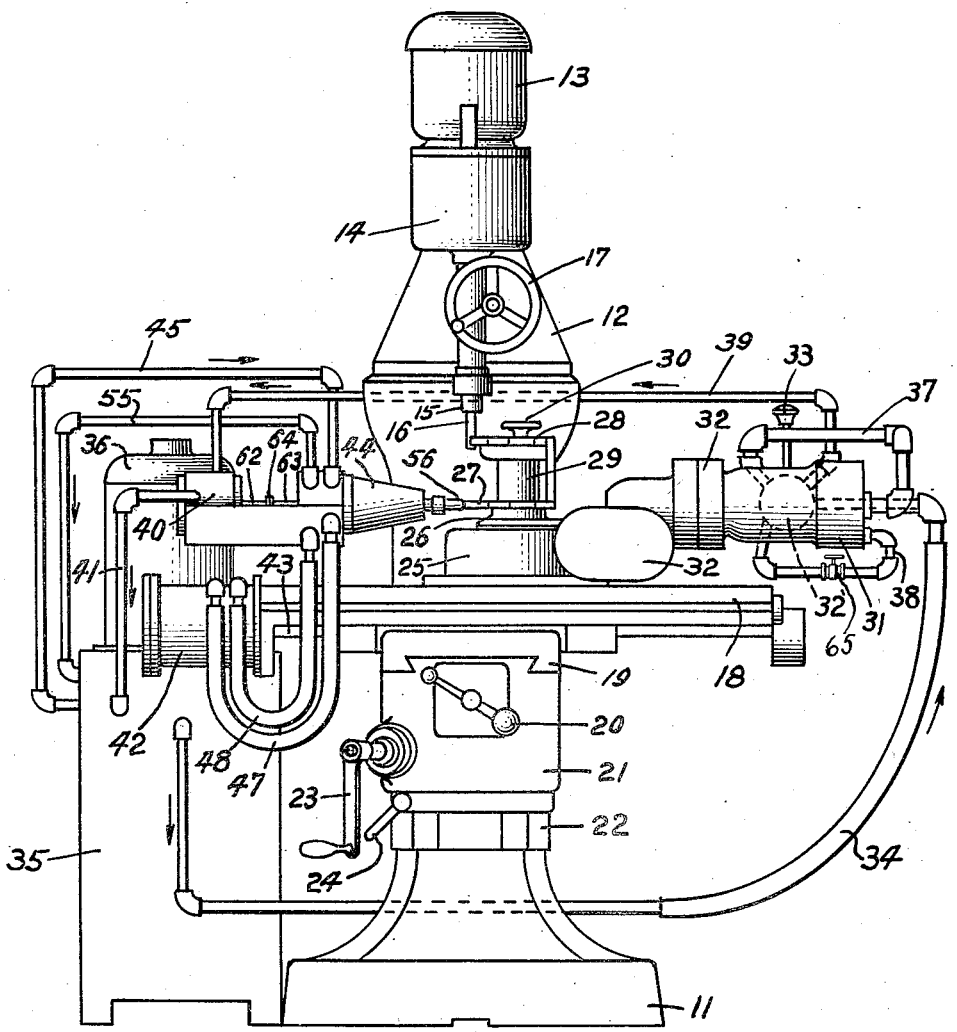
Fig. 1 is a front elevational view of a milling machine with the hydraulic duplicating attachment thereon.

Referring to the drawings, Fig. 1 shows a milling machine consisting of a base or standard 11 with a suitable upright column 12 for supporting a motor 13 and a milling head 14 connected thereto. Said milling head has downwardly depending therefrom a rotatable spindle 15 carrying a cutting tool 16, together with a manually operable hand wheel 17 governing longitudinal adjustment of said spindle. It will be understood that the milling machine described is of a standard type and that no claim is made thereto; the invention herein residing merely in the attachment therefore, hereinafter described.

A longitudinally adjustable slide 18 is provisioned upon the base 11 adapted for transverse movement relative to the rotatable cutter; and it will be noted that another slide 19 is supported upon base 11 interposed between slide 18 and said base for governing "in and out" transverse adjustment of slide 18. A suitable manually operable means 20 is provisioned for adjustment of slide 19. It is seen further that slide 19 is also supported upon the vertically adjustable slide 21, the latter being adapted for cooperative engagement with the vertically disposed guideways 22 forming a part of the base member 11.

Manually operable means 23 regulate vertical adjustment of slide 21; and locking means 24 are provided therefor.

Standard 25 secured upon slide 18 has rotatably journaled thereon a work and pattern support 26 for rotatably carrying the irregularly shaped pattern 27 and the work piece 28. In the present case the work piece represents possibly a carburetor wherein it is sought to mill the flange thereon in a shape corresponding to the pattern 27. It will be seen that the carburetor or other part 29 itself forms a base for the work piece 28 and is supported directly upon the pattern 27, and immovably bolted with respect thereto by bolt 30.

A fluid motor 31 is shown having attached thereto a housing 32 for speed reduction gearing and means for interconnecting motor 31 and the rotatable pattern and work support 26. It will be noted that the internal operation of the fluid motor and the speed reduction gearing form no part of the present invention as elements in themselves, but merely as unitary elements in the combinations hereinafter set out and claimed. The inventors make no claim to the fluid motor or the reduction gearing in themselves as a means for rotatably actuating the pattern and work support 26.

Suffice it to say that the fluid motor 31 operating for example at a relatively high speed in the neighborhood of 1000 R. P. M. rotatably actuates the work support 26 at a relatively low speed of approximately four revolutions per minute, by means of said speed reduction gearing above generally referred to in housing 32. It is understood that any other reduction may be employed.

Figure 2:
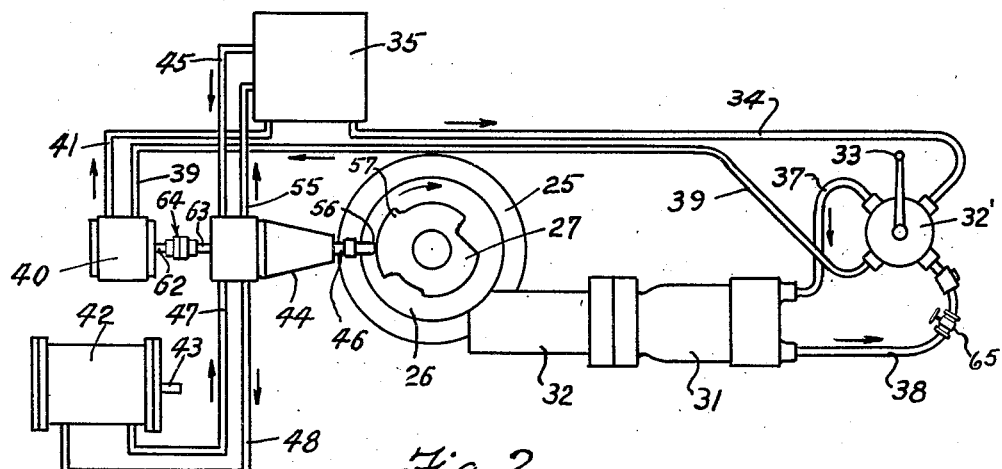
Fig. 2 is a diagrammatic view of the hydraulic connections of said attachment.

A manually operable reverse valve 32', best shown in Fig. 2, with a handle 33 is provided fluid under pressure through conduit 34 from a suitable hydraulic unit 35. Said hydraulic unit has provisioned therein a fluid storage sump and a suitable pump 36 for supplying fluid under pressure at a plurality of outlets.

Fluid in the reverse valve 32' is then directed to the fluid motor 31 through either conduit 37 or 38 depending upon the direction of movement desired and the manual positioning of the reverse control 33. If fluid is supplied through conduit 37, then the return fluid from the fluid motor flows back to the reverse valve 32' through conduit 38 or vice versa.

From the reverse valve 32' the exhaust fluid is conducted out through conduit 39 to the exhaust tracer controlled governor 40 whence said exhaust is conducted through conduit 41 back to the hydraulic unit 35. As hereinafter described said governor is a valve through which the exhaust from the fluid motor flows before returning to the hydraulic unit. Means are provided within the governor controlled by action of the tracer for constricting the openings through said governor whereby it will be seen that said exhaust is definitely controlled upon certain actions of the tracer, later to be described.

Control of this exhaust has the effect of controlling the rotary motion of the work table 26 which is operably connected to the fluid motor 31. Consequently it is seen that if the tracer engages a very sudden obstruction, necessitating a slowing down or stopping of the rotation of the work piece and pattern, the same may be accomplished through said governor in the manner hereinafter fully set out in detail.

A control cylinder 42 suitably secured to the slide 18 has a stationary piston provisioned therein secured to a relatively immovable piston rod 43 which is in turn secured to the slide support 19. Fluid under pressure from hydraulic unit 35 is conducted to tracer 44 through conduit 45 whence by action of the tracer spindle 46 as it engages the rotatable pattern 27, is conducted through either conduit 47 or 48 to opposite ends of the slide controlling cylinder 42 and the stationary piston therein.

Thus by controlling the flow of fluid to either end of cylinder 42 it is seen that reciprocable longitudinal movement of slide 18 may be accomplished. The rotatable work support 26 carried by slide 18 is thus adapted to reciprocable longitudinal movement with respect to the milling cutter 16, whereby the work piece 28 as it rotates with the rotating support 26 is brought into cooperative engagement with cutter 16.

It will be understood that by action of tracer 44 governing longitudinal movement of the rotating work that the contour and shape of the pattern is exactly reproduced therein, inasmuch as the work 28 and pattern 27 rotate together upon a common rotating support 26.

Figure 3:
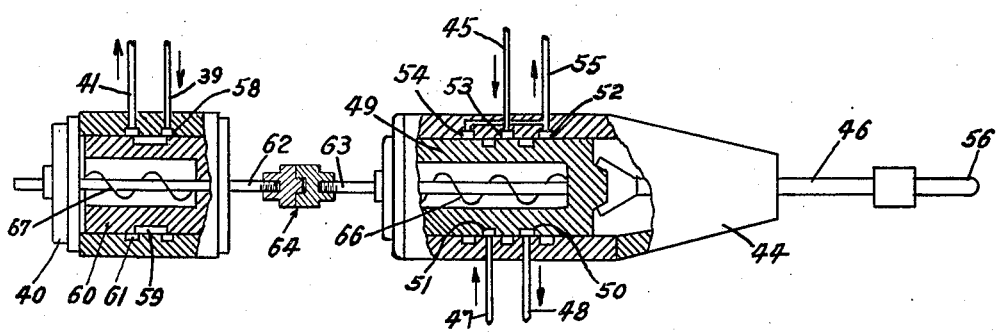
Fig. 3 is a fragmentary partially sectioned view illustrating the tracer and the exhaust governor.

A suitable valve 49 shown in Fig. 3 has annular openings 50 and 51 provided therein, while the tracer housing 44 has annular openings 52, 53 and 54. Fluid under pressure from the hydraulic unit 35 enters the tracer through conduit 45 and opening 53 whence, depending upon the spindle controlled position of valve 49 is delivered to either outlet opening 50 or 51 to be conducted to one end or the other of feed cylinder 42 through conduits 48 and 47 respectively.

For instance if fluid is conducted out through conduit 48 exhaust fluid from the other end of cylinder 42 is returned through conduit 47 to valve opening 51, where by the position of the spindle controlled valve 49 is permitted to exhaust through opening 54 and conduit 55 back to the hydraulic unit 35.

In another position of valve 49 fluid will be conducted to the other end of cylinder 42 through conduit 47 and the exhaust from the opposite end of said cylinder will return through conduit 48 whence by the position of valve 42 will be directed through openings 50 and 52 and out through conduit 55 back to the hydraulic unit 35.

By operation of the tracer spindle 46, tracer valve 49 and cylinder 42, the tracer tip 56 is continuously maintained in cooperative engagement with the surface of the rotatable pattern 27. The movement of the spindle 46 causing movement of valve 49 consequently causes movement of the work supporting slide 18 in such manner that the tracer tip 56 is at all times in engagement with the surface of pattern 27.

Upon encountering an obstruction longitudinal movement of the spindle is obtained causing corresponding movement of the valve 49. In the manner above outlined feed movement of the slide 18 is regulated so that cutter 16 is correspondingly presented for engagement with the work piece 28. Feed movement of slide 18 is thus sufficient to maintain the tracer tip 56 in operative engagement with the varying periphery of the pattern.

At the moment however that a relatively sudden obstruction in the pattern is reached, as at for instance the point 57, spindle 46 is actuated for a greater longitudinal movement than where a slight change in direction is encountered. To prevent breaking of the cutter 16 or damage to the work piece 28 it is desirable that at this point the rotation of the pattern and work be substantially slowed down or entirely stopped until by action of the cylinder 42 the slide 18 is so actuated as to re-position the work relatively to the cutter.

The governor 40 hereinbefore referred to is adapted to control rotary movement of the work and pattern supporting table 26 by controlling the exhaust fluid from the fluid motor 31 and reverse valve 32' which is adapted to pass through said governor before returning to the hydraulic unit 35.

As seen in Figs. 2 and 3 the exhaust from the fluid motor 31 is conducted out through either conduit 37 or 38 to the reverse valve 32', and thence out through conduit 39 to governor 40. Fluid travels through the governor inlet 58, through the annular recess 59 in the valve member 60, and out through the governor outlet 61 and conduit 41 back to the hydraulic unit 35.

It will be noted that the governor valve 60 adapted to reciprocable movement within the governor housing 40 is interconnected with the tracer controlled valve 49 by means of the shafts 62 and 63 adjustable coupled at 64. Consequently upon spindle actuated movement of tracer valve 49, it is seen that a corresponding longitudinal movement is given to the governor valve 60.

Recess 59 in valve 60 provides a means of fluid connection between the governor inlet 58 and the outlet 61 for conducting fluid from the work actuating fluid motor 31 through the governor and back to the hydraulic unit 35.

In normal operation of spindle 46 only slight movement is given to governor valve 60 so that there is little if any constriction of the fluid passages through governor 40. However upon the tracer tip 56 engaging a more severe obstruction, considerably more movement of the spindle is obtained with the result that more movement of the governor valve 60 is obtained, partially or completely constricting the openings through the governor. Consequently the exhaust fluid flowing through the governor is restricted or possibly entirely stopped. This will result in temporarily slowing down or stopping of the fluid motor 31 and the rotatable work piece and pattern, and thus will prevent breakage of the cutting tool or damage to the work piece.

A metering valve 65 is shown in Figs. 1 and 2 in the fluid line 38 to the fluid motor 31, whereby the speed of rotation thereof may be manually regulated.

Springs 66 and 67 are employed in connection with valve pistons 49 and 60 of the tracer and governor respectively, to resiliently operate against the tracer spindle.

Consequently when the tracer tip 56 is not in engagement with pattern 27, action of springs 66 and 67 cause a slight movement longitudinally to the right of governor piston 60. Consequently the work will not rotate until the tracer tip 56 contacts the pattern 27.

Having described our invention, reference should now be had to the claims which follow for determining the scope thereof.

We claim:

1. An attachment for a milling machine having a longitudinally reciprocable table and a cutter adapted to engage a rotatable work piece, comprising hydraulically actuated means governing movement of said table, a rotatable support on said table co-axially supporting a work piece and a pattern, a tracer operatively engaging said pattern for controlling fluid to said hydraulic means, a hydraulic motor for rotatably actuating said pattern and work support, a hydraulic unit for supplying fluid under pressure to said hydraulic motor and to said tracer for direction to said hydraulic means, and a fluid exhaust controlling governor operably connected to and actuated by said tracer for regulating the speed of said hydraulic motor.

2. An attachment for a milling machine having a longitudinally reciprocable table and a cutter adapted to engage a rotatable work piece, comprising a relatively movable cylinder and piston governing movement of said table, a rotatable support on said table co-axially supporting the work piece and a pattern, a tracer operably engaging said pattern for controlling fluid to either end of said cylinder, a hydraulic motor on said table for rotatably actuating said support, a hydraulic unit for supplying fluid under pressure to said hydraulic motor and to said tracer for direction to either end of said cylinder, and a fluid exhaust controlling governor operably connected to and actuated by said tracer for regulating the speed of said hydraulic motor.

3. An attachment for a milling machine having a longitudinally reciprocable table and a cutter adapted to engage a rotatable work piece, comprising a relatively movable cylinder and piston governing movement of said table, a rotatable support on said table co-axially supporting the work piece and a pattern, a tracer housing having a longitudinally movable spindle extending therefrom operatively engaging said pattern, a fluid control valve in said housing operably engaged by said spindle for controlling fluid to either end of said cylinder, a hydraulic motor on said table for rotatably actuating said support, and a fluid exhaust controlling governor operably connected to and actuated by said tracer for regulating the speed of said hydraulic motor.

4. An attachment for a milling machine having a longitudinally reciprocable table and a cutter adapted to engage a rotatable work piece, comprising a relatively movable cylinder and piston governing movement of said table, a rotatable support on said table co-axially supporting the work piece and a pattern, a tracer housing having a longitudinally movable spindle extending therefrom operatively engaging said pattern, a fluid control valve in said housing operably engaged by said spindle for controlling fluid to either end of said cylinder, a hydraulic motor for rotatably actuating said support, a governor housing having a longitudinally movable valve therein for controlling the exhaust fluid from said motor for regulating the speed thereof, and means interconnecting said governor valve and said tracer valve for movement therewith.

5. An attachment for a milling machine having a longitudinally reciprocable table and a cutter adapted to operatively engage a rotatable work piece, comprised of hydraulically actuated means governing movement of said table, a rotatable support on said table co-axially supporting a work piece and a pattern, a tracer housing having a longitudinally movable spindle extending therefrom operatively engaging said pattern. a control valve in said housing operatively engaged by said spindle for controlling fluid to either end of said hydraulic means, resilient means engaging said valve, a hydraulic motor for rotatably actuating said pattern and work support, a governor housing through which the exhaust fluid from said hydraulic motor is directed, a fluid control valve in said housing, operably connected to said tracer valve for movement therewith, and resilient means engaging said governor valve, both said resilient means being adapted to maintain said governor valve constricted when the tracer is out of engagement with said pattern.

6. An attachment for a milling machine having a longitudinally reciprocable table and a cutter adapted to operatively engage a rotatable work piece, comprised of hydraulically actuated means governing movement of said table, a rotatable support on said table co-axially supporting a work piece and a pattern, a tracer housing having a longitudinally movable spindle extending therefrom operatively engaging said pattern, a control valve in said housing operatively engaged by said spindle for controlling fluid to either end of said hydraulic means, resilient means engaging said valve, a hydraulic motor for rotatably actuating said pattern and work support, a governor housing through which the exhaust fluid from said hydraulic motor is directed, a fluid control valve in said housing, operably connected to said tracer valve for movement therewith, and resilient means engaging said governor valve, said governor valve being so positioned that upon slight movement thereof there is substantially no constriction to the flow of fluid motor exhaust therethrough, but which upon greater movement becomes substantially constricted.

7. An attachment for a milling machine having a longitudinally reciprocable table and a cutter adapted to engage a rotatable work piece, comprising hydraulically actuated means governing movement of said table, a rotatable support on said table co-axially supporting a work piece and a pattern, a tracer operatively engaging said pattern for controlling fluid to said hydraulic means, a hydraulic motor for rotatably actuating said pattern and work support, a fluid exhaust controlling governor operably connected to and actuated by said tracer, and means for conducting exhaust fluid from said motor and through said governor for regulating the speed of said hydraulic motor.

8. An attachment for a milling machine having a longitudinally reciprocable table and a cutter adapted to engage a rotatable work piece, comprising a relatively movable cylinder and piston governing movement of said table, a hydraulically actuated rotatable support on said table co-axially supporting the work piece and a pattern, a tracer housing having a longitudinally movable spindle extending therefrom operatively engaging said pattern, a fluid control valve in said housing operably engaged by said spindle for controlling fluid to either end of said cylinder, a fluid exhaust controlling governor operably connected to and actuated by said tracer, and means for conducting exhaust fluid from said rotatable support and through said governor for regulating the speed of said rotatable support.

9. An attachment for a milling machine having a longitudinally reciprocable table and a cutter adapted to engage a rotatable work piece, comprising hydraulically actuated means governing movement of said table, a hydraulically actuated rotatable support on said table co-axially supporting a work piece and a pattern, a tracer operatively engaging said pattern for controlling fluid to said hydraulic means, a fluid exhaust controlling governor operably connected to and actuated by said tracer, and means for conducting exhaust fluid from said rotatable support and through said governor for regulating the speed of said rotatable support.

10. An attachment for a milling machine having a longitudinally reciprocable table and a cutter adapted to operatively engage a rotatable work piece, comprised of hydraulic table moving means, a rotatable support on said table co-axially supporting a work piece and a pattern, a spindle operatively engaging said pattern, a control valve operatively engaged by said spindle for controlling fluid to either end of said hydraulic means, resilient means engaging said valve, a fluid control governor valve operatively connected to said tracer valve for movement therewith for regulating the speed of said rotatable support, and resilient means engaging said governor valve, said governor valve being so positioned that upon slight movement thereof there is substantially no constriction to the flow of fluid motor exhaust therethrough, but which upon greater movement becomes substantially constricted.

11. An attachment for a milling machine having a longitudinally reciprocal table and a cutter adapted to engage a rotatable work piece, comprising hydraulically actuated means governing movement of said table, a fluid actuated rotatable support on said table supporting a work piece and a pattern, a tracer operatively engaging said pattern for controlling actuation of said means, a governor associated with said tracer and responsive to movements thereof, and means for conducting exhaust fluid from said support through said governor for regulating the speed of rotation of said support.

12. An attachment for a milling machine having a longitudinally reciprocal table and a cutter adapted to engage a rotatable work piece, comprising hydraulically actuated means governing movement of said table, a fluid actuated rotatable support on said table supporting a work piece and a pattern, a tracer operatively engaging said pattern for controlling actuation of said means, fluid constricting means forming a part of said tracer and responsive to movements thereof, and means for conducting exhaust fluid from said support and through said constricting means for regulating the speed of rotation of said support.

CURTIS WALKER.
MANUEL TURCHAN.